Oct. 6, 1970  R. F. WEST  3,532,928
LIGHT-FAILURE WARNING SYSTEM WITH OPPOSITELY WOUND
WOUND TRANSFORMER AND SCR LOGIC CIRCUIT
Filed May 10, 1967
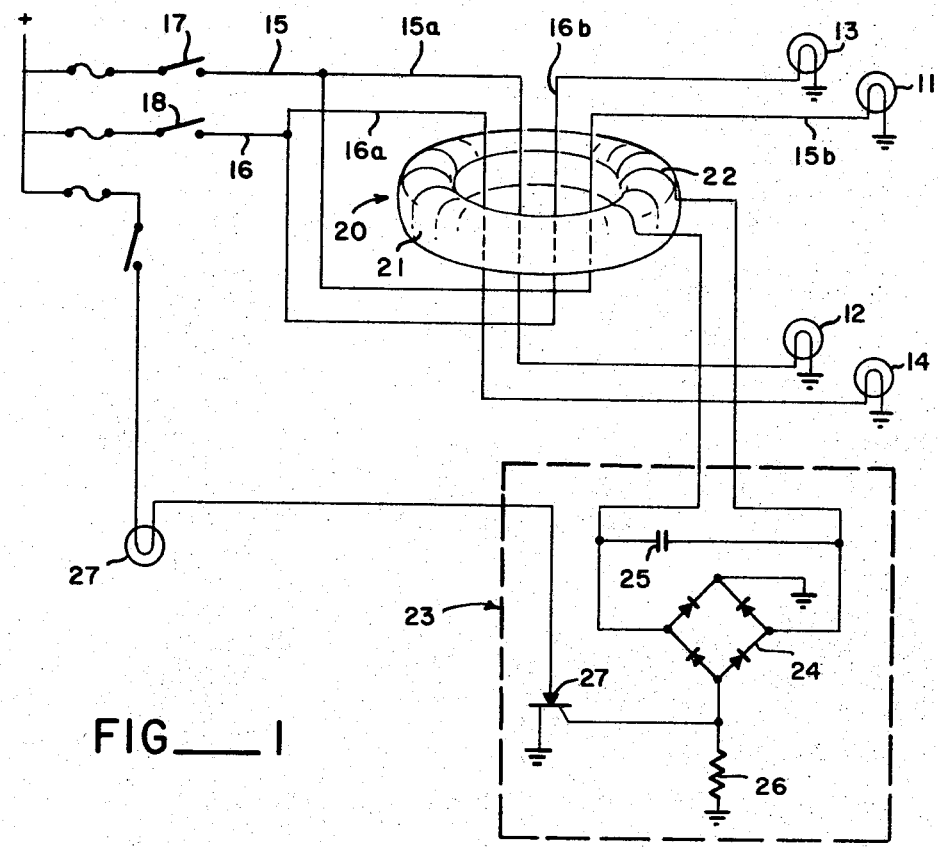
FIG__1
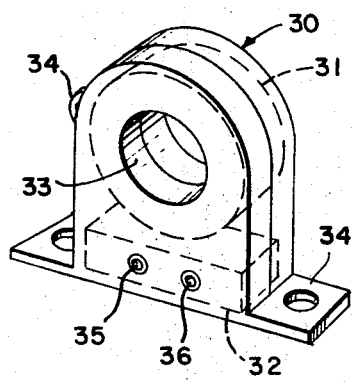
FIG__2
ROGER F. WEST
*INVENTOR.*
BY *Seed, Berry & Dawney*
ATTORNEYS З,532,928
Patented Oct. 6, 1970

3,532,928
LIGHT-FAILURE WARNING SYSTEM WITH OPPOSITELY WOUND TRANSFORMER AND SCR LOGIC CIRCUIT
Roger F. West, 4145 Beach Drive SW., Seattle, Wash. 98116
Filed May 10, 1967, Ser. No. 637,558
Int. Cl. B60q 1/02; G08b 21/00
U.S. Cl. 315—83                                                1 Claim

ABSTRACT OF THE DISCLOSURE

A light-failure warning system well suited for motor vehicles in which the leads for corresponding right and left side lamps are made transformer primaries of opposite sense and the secondary winding of the transformer is connected to a logic circuit which triggers when the primaries are not in balance responsive to a lamp failure to activate a warning lamp or other device.

---

This invention relates to electric circuit failure warning devices, and while applicable to various circuit arrangements is particularly intended for use in association with the lighting circuits of motor vehicles.

Failure of vehicle lights, if permitted to continue undetected by the driver, can be a series hazard to highway safety. This danger has been recognized as respects automotive turn signals, and as a result most vehicles have a pair of right and left turn-signal light indicators on the dashbord which cease to operate when one of the front or rear lights in the respective indicator circuit fails. However, a warning system for failure of other external lights of highway vehicles, though equally important for safe driving, particularly as respect the rear brake warning lights, is not provided.

Accordingly, the present invention aims to provide an improved light-failure warning system which does not require interruption of the wiring in the light circuits, and therefore can be quickly and easily installed. A related further object is to provide such a warning system which can function for more than one pair or set of lights.

The external lights of a motor vehicle are normally paired, e.g. right and left hand tail lights, brake lights, indicator lights, head lights, side lights, etc., and the lights of each such pair are conventionally wired in parallel circuits. In accordance with the present invention the two parallel power circuits for a pair of lamps become primaries of opposite hand of a transformer, the secondary winding of which is associated with a warning circuit. While both of the lamps operate properly the two primaries are in a balanced relationship, whereas if one of the lamps should fail the balance is disturbed and current is induced in the secondary thereby activating a visual and/or audio warning indicator in the associated warning circuits.

The invention will be clearly understood from the following description of a preferred form which it may assume, and by making reference to the accompanying drawing in which:

FIG. 1 is a circuit diagram of a warning system embodying the invention; and

FIG. 2 is a perspective view with parts broken away showing a housing for the warning device.

In carrying the invention into effect in a convenient manner the concerned vehicle lamps are paired in parallel, the pairing being in accordance with the left-side and right-side disposition of the lamps on the motor vehicle. For purposes of example, in FIG. 1 it will be assumed that lamps 11 and 12 are side lamps located respectively on the left and right side of the vehicle, and that lamps 13 and 14 are similarly displaced left and right rear stop lights. The power circuits 15 and 16, for these pairs of lamps 11–12 and 13–14 are controlled by a manual switch 17 and a brake-pedal actuated switch 18, and branch into parallel leads 15a–15b and 16a–16b extending to the respective lamps and then to ground.

In accordance with the present invention the lamp leads are threaded through the center of the core 21 of a transformer 20 to become primary windings each of which may be considered as having a single turn. The threading direction of the leads of each pair 15a–15b and 16a–16b are made opposite to one another so that the leads 15a and 16a, for example, may be considered as being routed clockwise and the leads 15b and 16b as counterclockwise. By this arrangement when both side lamps 11–12 are operating properly the respective primaries (leads) 15a–15b balance one another so that there is no net inductive effect, and the same is true as respects the primaries (leads) 16a–16b when both stop lights 13–14 are lit. It will be apparent that other pairs of lighting circuits may be split and similarly routed through the transformer.

The core 21 is wound with a secondary 22 having its leads connected to a simple logic circuit 23 which may comprise a bridge rectifier 24, a high frequency suppression capacitor 25, a load resistance 26 and a silicon controlled rectifier 27. A warning lamp 28 and/or a suitable audio warning device is connected between the positive supply circuit and ground by the rectifier 27.

When a lighting switch is closed in normal conditions it will be apparent that the ampere-turns of each loop of a pair of circuits are balanced and no flux change in the transformer core 21 will result. If however a lamp has failed then the ampere-turns are no longer balanced and a flux change takes place producing either a positive or negative going pulse from the secondary winding. The bridge rectifier 23 insures that this pulse is always positive going across the load resistance 26. This positive pulse triggers the controlled rectifier 11 and lights the warning lamp 28 indicating a lighting failure. It will also be apparent that if a lamp fails during operation an ampere turn unbalance will occur producing a pulse from the transformer and activating the warning lamp. The sensitivity of the logic circuit may be adjusted and nulled to take into account variances in the resistances of the individual lamp circuits in each pair.

Referring to FIG. 2, the core 21 and components of the logic circuit 23 may be carried in a split dielectric housing 30 providing an annular chamber 31 for the core 21 and a base cavity 32 for the logic circuit components. The housing 30 is formed with an eye 33 at the center of the chamber 31 through which the various light leads may be threaded in the manner described. Mounting ears 34 or a suitable mounting bracket are provided for bolting the housing to the vehicle chassis, and ground and warning indicator terminals 35–36 are provided for a ground lead and for a lead to the warning lamp 27 provided on the dashboard or other convenient location.

From the above description it will be seen that the invention provides a simple and effective means of indicating a lighting fault without introducing any components into the lighting circuits which could effect their reliability or reduce the ability to clear short circuit faults by blowing fuses, but it should be understood that the invention is not limited solely to the details of the form described above which may be modified, in order to meet various conditions and requirements encountered, without departing from the scope of the invention. Furthermore, although described for use with respect to motor vehicle lighting circuits, it will be apparent that the invention may be used as well on ships or aircraft. Also, each primary lead may be connected to a series of lamps rather than a single lamp, as long as the respective parallel primary lead of opposite sense has substantially the same lamp load. The invention also contemplates possible use of more than one warning circuit on a vehicle, and that multiple such circuits may be parallel-connected to the same warning indicator. Although the invention has been described with a single pass of each primary lead through the core since such will normally give the easiest installation, it is contemplated that in some instances one or more complete loop of the primary lead may be made.

The embodiments of the invention in which an exclusive property or privilege is claimed are defined as follows:

1. A vehicle D.C. light-failure warning system comprising, an electrically actuated warning circuit having a warning device, a pair of approximately balanced, direct-current vehicle light circuits, a transformer including said light circuits as primary windings of opposite sense and having a secondary winding in which a current pulse is produced responsive to the D.C. transient voltage caused by failure of one of said light circuits, and D.C. logic circuit means connected to said secondary winding and to said warning circuit for actuating said warning device responsive to a said D.C. transient pulse of predetermined intensity, said logic circuit means comprising a bridge rectifier connected to the ends of said secondary winding and having a load resistance, and a silicon controlled rectifier connected between said bridge rectifier and load resistance and arranged to act as a gate for said warning circuit.

References Cited
UNITED STATES PATENTS

| | | | |
|---|---|---|---|
| 1,805,764 | 5/1931 | Everett et al. | 315—88 |
| 1,972,514 | 9/1934 | Engelhard et al. | 315—77 |
| 1,997,848 | 4/1935 | Ballou | 315—178 X |
| 3,311,779 | 4/1967 | Hartkorn | 315—83 |
| 3,250,950 | 5/1966 | Reiche | 315—82 |
| 3,253,220 | 5/1966 | Hordosi | 324—51 X |
| 3,405,357 | 10/1968 | Thompson | 324—51 |
| 2,719,288 | 9/1955 | Young | 340—251 |
| 3,143,729 | 8/1964 | Power | 340—251 X |

JAMES W. LAWRENCE, Primary Examiner

D. O'REILLY, Assistant Examiner

U.S. Cl. X.R.

315—88; 340—251